(12) United States Patent
Bruschi

(10) Patent No.: US 6,195,830 B1
(45) Date of Patent: Mar. 6, 2001

(54) MULTI-COLORED PAINTBRUSH HANDLE AND THE PROCESS FOR MANUFACTURING SAID HANDLE

(75) Inventor: Mario Bruschi, Bollate (IT)

(73) Assignee: John Palmer Corp., East Brunswick, NJ (US)

( * ) Notice: Subject to any disclaimer, the term of this patent is extended or adjusted under 35 U.S.C. 154(b) by 0 days.

(21) Appl. No.: 09/166,292

(22) Filed: Oct. 5, 1998

(30) Foreign Application Priority Data

Oct. 7, 1997 (IT) .............................. MI97A2275

(51) Int. Cl.⁷ .............................. A46B 5/00; B29C 45/13; B25G 1/10
(52) U.S. Cl. .......................... 15/143.1; 15/159.1; 16/431; 16/430; 16/441; 264/243; 264/245; 264/247; 264/260; 264/275; 264/279; 264/328.8
(58) Field of Search ................................ 15/159.1, 143.1; 16/431, 436, 430, 902, 441; 264/243, 255, 328.12, 245, 247, 251, 328.1, 328.8, 279, 275, 260

(56) References Cited

U.S. PATENT DOCUMENTS

| | | |
|---|---|---|
| 5,261,665 | * 11/1993 | Downey . |
| 5,290,063 | * 3/1994 | Lenhart . |
| 5,475,894 | * 12/1995 | Wildforster . |
| 5,530,989 | * 7/1996 | Remmert et al. . |
| 5,740,586 | * 4/1998 | Gomas . |
| 5,800,751 | 9/1998 | Barker . |
| 5,920,943 | * 7/1999 | Barker . |
| 5,964,009 | * 10/1999 | Hoepfl et al. . |

FOREIGN PATENT DOCUMENTS

| | | |
|---|---|---|
| 3622596 | 1/1987 | (DE) . |
| 19632313 | 2/1997 | (DE) . |
| 2544649 | 10/1984 | (FR) . |
| 2264062 | 8/1993 | (GB) . |
| 2274615 | 8/1994 | (GB) . |
| 9316846 | 9/1993 | (WO) . |

* cited by examiner

Primary Examiner—Deborah Jones
Assistant Examiner—Jennifer McNeil
(74) Attorney, Agent, or Firm—Browdy and Neimark

(57) ABSTRACT

The invention involves a multi-colored paintbrush handle having an axis (8), a first and a second extremity crossed by the axis (8), and an external grip surface (9) placed between said extremities, the handle including: a core (13) parallel to the axis (8), at least one colored raised part (14) emerging from the core (13) and externally defining at least one shaped section of the grip surface (9), and at least a first layer (16) of colored plastic material molded onto the core (13), the first layer (16) externally defining a main section (11) of the grip surface (9) and having a different color than that of the raised part (14).

9 Claims, 2 Drawing Sheets

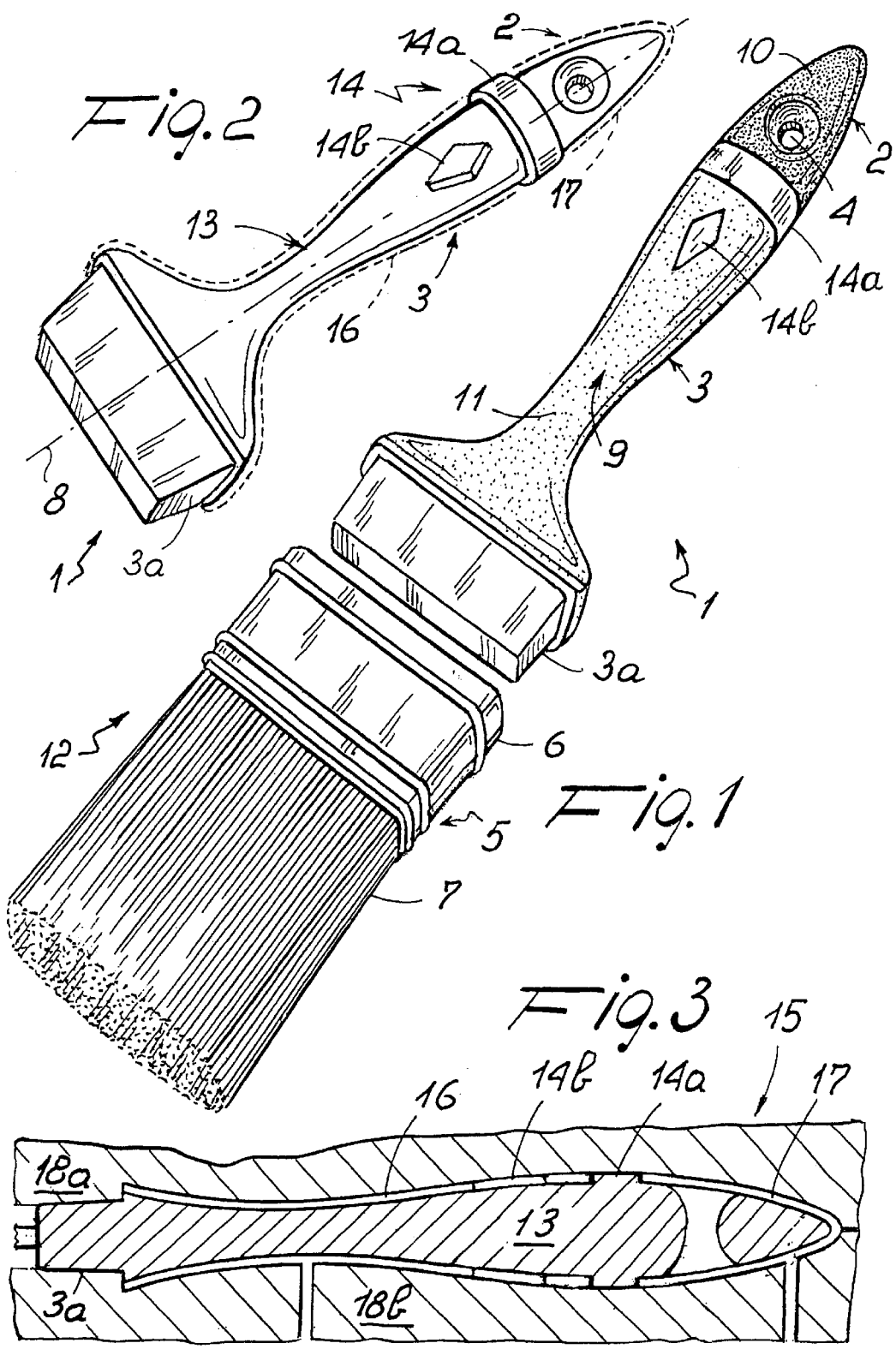

MULTI-COLORED PAINTBRUSH HANDLE AND THE PROCESS FOR MANUFACTURING SAID HANDLE

FIELD OF THE INVENTION

The invention refers to a multi-colored paintbrush handle, of the type having an axis, a first and a second extremity crossed by said axis, and an external grip surface placed between said extremities and having at least two different colors.

DESCRIPTION OF THE PRIOR ART

As it is known, paintbrush handles used in normal painting operations are manufactured with two or more colors. Higher quality paintbrushes have three-colored handles: one color for the tip of the handle, where there usually is a hole that is used to hang the brush; a second color for the body or main part of the handle, which extends to the operative part of the brush or to the band that holds the brush bristles; and a third color for a ring or similar part that separates the handle tip from the handle body. The colors (which include also black and white) have a decorative function, to attract potential buyers when the brushes are hanging on display in a store, as well as an important identification role.

That is, they enable someone to identify one paintbrush from another at a glance, and, above all, to distinguish between different types of paintbrushes, which could have different manufacturer, size, bristle type, and type of paint the brushes are best suited for. Thus, brushes produced by the same manufacturer and having the same size, for instance, could have tips of special colors according to the type of bristle or most suitable paint to be used.

As well, the aforementioned body or "main part" of the paintbrush handle often contains writing or symbols, such as trademarks, information on the manufacturer, paintbrush features, and quality certification.

All of these features, colors and writings or symbols are the source of a variety of technical problems.

The colors and writings must retain their brightness and legibility over time; they must remain like new, without undergoing fading or damage, notwithstanding intense use of the paintbrush and despite the fact the brushes come into contact with solvents and a variety of chemical substances. Furthermore, the quality of the materials and surface finish used must be satisfactory, if a number of important ergonomic requirements are to be met.

A paintbrush is often used for considerable amounts of time, meaning that it will often remain in contact with the hand holding it for long periods. If the materials used to make the handle and to finish its surface are not of the highest quality, they could cause localized skin irritation, which could impact negatively on both the work in progress and the future purchase of similar paintbrushes.

From an ergonomic point of view, it is important that the colored surfaces not be slippery. Otherwise, one will be forced to expend more physical and mental energy to handle the brush, so as to avoid dropping it accidentally.

Finally, long-lasting brush colors, as well as good ergonomic quality levels, relative to the type of finish used on surfaces that come into contact with human hands, must be obtained at relatively low cost, both for obvious reasons of market competitiveness and to fairly balance the costs of the paintbrush's separate parts. In other words, the handle is only one part of the paintbrush, and significant costs must already be incurred to produce the operative portion of the brush with bristles.

Up until now, multi-colored paintbrush handles have primarily been manufactured using special paint techniques, which involve applying a base coat to specially shaped holders and then painting the different parts by means of a graduated dipping of the handle in different paints.

The disadvantages of this process are that it is slow, expensive, inaccurate, limited in the styling or design options available, and potentially polluting because of the use of paint. Furthermore, the paints used often fade or get damaged (chipped, for example).

These drawbacks can, in part, be overcome by using molding techniques to make handles of colored plastic material. In any case, though, in order to produce multi-colored handles, one must make each piece separately with its own color and then assemble the pieces in order along an assembly line.

All of the above involves considerable overall costs. Furthermore, the assembly must be completely reliable and stable, in order to ensure the solidity of the handle and avoid the risk over time that it breaks or separates into its individual pieces.

SUMMARY OF THE INVENTION

The technical aim underlying the present invention is to realize a multi-colored paintbrush handle able to substantially overcome the cited drawbacks.

This technical aim is substantially achieved by a multi-colored paintbrush handle having an axis, a first and a second extremity crossed by said axis, an external grip surface placed between said extremities, and including: a core substantially parallel to said axis, at least one colored raised part emerging from said core and defining at least one shaped section of said grip surface, and at least a first layer of colored plastic material molded onto said core, said first layer defining a main section of said grip surface and having a different color than that of said raised part.

BRIEF DESCRIPTION OF THE DRAWINGS

Further particularities and the advantages will be more clearly understood from the detailed description of a preferred embodiment of the invention, shown in the enclosed drawings, in which:

FIG. 1 shows a perspective and exploded view of a paintbrush having a three-colored handle;

FIG. 2 shows a perspective and look-through sectional view of the parts forming the handle in FIG. 1;

FIG. 3 shows a phase in the production of the handle in FIG. 2, in a single mold shown in sectional view.

DESCRIPTION OF THE PREFERRED EMBODIMENT

Figure 4:
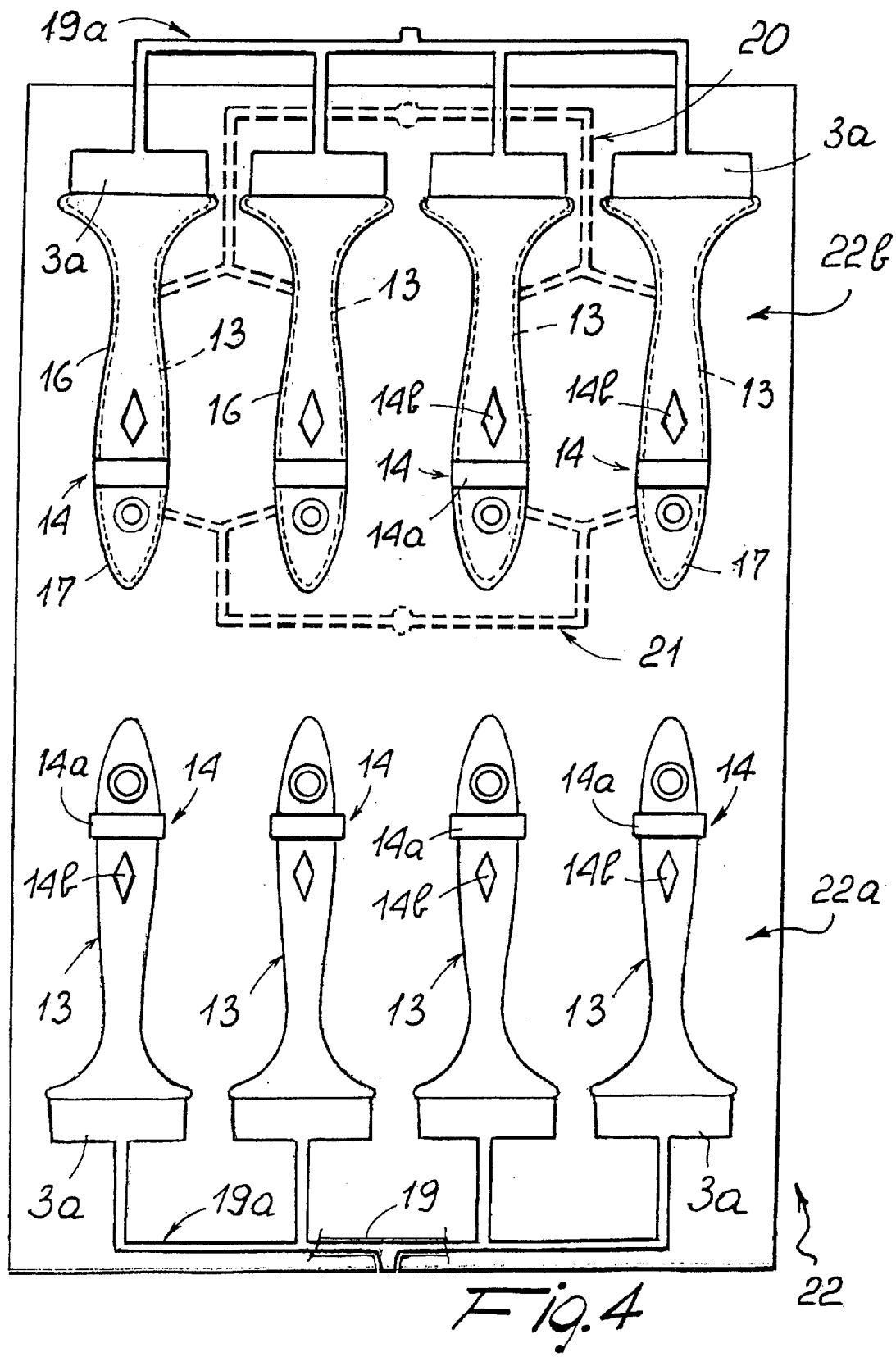
FIG. 4 is a plan view of a gang half-die to simultaneously produce numerous handles as per the invention.

The multi-colored paintbrush handle, according to the invention, is illustrated in detail in enclosed FIG. 1 and 2, and is referred to as number 1.

Said handle consists of a tip 2 and a body 3. The tip 2 includes a first extremity of the handle 1 and contains a hole 4 to be used to hang the paintbrush to a wall.

The body 3 extends to a second extremity of the handle 1, at the opposite end from the first extremity, and sustains a working part 5 of the brush, including a metal band or ferrule 6 and bristles 7 enclosed by the ferrule 6.

In particular, the body 3 includes an end-piece 3a that is tightly enclosed by the ferrule 6.

The tip 2 and body 3 are aligned along a handle axis 8, which coincides with the main development direction of the paintbrush.

Externally, the handle 1 features a grip surface 9 and the tip 2 and the body 3 have exterior surfaces that are, respectively, a tip section 10 and a main section 11 of the grip surface 9.

FIG. 2 shows that the handle 1 of the paintbrush—the latter in its entirety indicated as number 12—has an internal elongated massive core 13 extending along the handle axis 8.

In terms of width, that is in relation to cross-sections of the axis 8, the core 13 is narrower than the handle 1.

The core 13 has raised parts 14 integral therewith that emerge from the core 13 and provide shaped features to the grip surface 9.

The core 13 and raised parts 14 are made of a single piece of colored plastic material.

A single raised part can be used to make an intermediate annular protrusion, or else to create a distinctive element.

As shown in the drawings, the intermediate annular protrusion develops all around core 13 about the axis 8 and separates the tip 2 from the body 3, while the distinctive element can be a trademark, writing, or other.

It is preferable to provide a number of raised parts 14 spaced from one another: for instance, a first raised part 14a to create said intermediate annular protrusion, and a second raised part 14b to create said distinctive element.

On the core 13 it is preferable to provide two molded layers of colored plastic material at opposite sides of the annular protrusion 14a.

A first layer 16 forms an exterior surface that extends between the end-piece 3a and the tip 2, and leaves both tip 2 and raised parts 14 in view.

In short, as shown in the drawings, the first layer 16 has a thickness substantially corresponding to the radial height of the annular protrusion 14a and makes the core 13 thicker in correspondence to the body 3; this in turn determines the final thickness of the body 3, and creates the main section 11 of the grip surface 9. The first layer 16 is given a different color than the raised parts 14 and the core 13.

A second layer 17 of colored plastic material is then applied by molding onto the core 13 near the tip 2. As shown in the drawings, the second layer 17 also has a thickness substantially corresponding to the redial height if the annular protrusion 14a and this makes the core 13 thicker and determines the final size of the tip 2, and creates the tip section 10 of the grip surface 9.

The second layer 17 has a different color than the core 13, the raised parts 14 and the first layer 16, so as to create a three-colored handle. The colors may be chosen at will, including also black and white.

Application of the first and second layers 16 and 17 to the core 13 along the sides of the first raised part 14a is shown in FIG. 3, which illustrates an example of a single mold 15 formed by a lower part 18a and an upper part 18b, which tightly enclose the core 13 between them.

At least the first layer 16 is made of soft thermoplastic rubber.

An example of soft thermoplastic rubber is polypropylene mixed with vulcanized rubber, which contains between 15% and 25% polypropylene by weight, and between 75% and 85% vulcanized rubber by weight.

Therefore, even though it can be treated like any common plastic, the first layer is soft to the touch and provides a good level of friction, so as to reduce the risk of accidental slips to a minimum.

The process for manufacturing the handle 1 of the paintbrush 12 is as follows.

The first operation consists of producing the aforementioned core 13 having the aforementioned raised parts 14, which expand to the grip surface 9.

Apart from the raised parts 14, the core 13 is made thinner than the handle 1 in progress.

The core 13 and raised parts 14 are made in a single piece, by injection molding a colored plastic material, as shown, for example, at a first mold section of the gang semidie in FIG. 4, as described in greater detail below.

In the second phase, as shown in FIG. 3, at a second mold section of the gang half-die in FIG. 4, at least the first layer 16 of colored plastic is applied by injection molding to the core 13, at the edge of the raised parts 14.

The first layer 16 is formed so as to ensure that it has an exterior surface which substantially coincides with the surface of the body 3 to be made. Furthermore, it is preferable if the first layer 16 is given a different color than that of the raised parts 14.

If the raised parts 14 form an intermediate annular protrusion 14a that divides the grip surface 9 in two, both the first layer 16 and second layer 17 of colored plastic material are molded simultaneously onto the core 13, so as to define the outer surfaces of, respectively, the body 3 and the tip 2.

The intermediate annular protrusion 14a is advantageously used in the molding process: it is enclosed tight between the lower part 18a and upper part 18b of the mold (FIG. 3), so as not only to separate the first layer 16 and second layer 17, but also to sustain in position the core 13, which substantially must be suspended in the mold in order to leave room for layers 16 and 17.

FIG. 3 shows that, during molding of the first and second layers 16 and 17, the core 13 is sustained also by the end-piece 3a, which terminates the handle 1. This ensures the stability of the core 13, even despite the strong pressure applied during injection of the plastic material to make the two layers. The fact that the colored plastic material of the first layer 16 does not cover the end-piece 3a has no practical importance, given that the end-piece 3a is fully inserted into the ferrule 6.

In order to produce the handle 1 as per the invention, an injection molding means is used, including a special gang die that is able to carry out all the aforementioned phases in forming the handles 1 and to simultaneously form numerous handles in a fast, simple, efficient manner.

In regards to this gang die, FIG. 4 shows a gang half-die 22 in the situation immediately following molding, when the die is still engaged with the cores 13 and handles 1.

In greater detail, the gang half-die 22 includes primary and secondary molding devices, formed by two of its main portions: a first mold portion 22a is used to produce a plurality of cores 13 in side-by-side relationship together with raised parts 14a and 14b, while a second mold portion 22b is used to produce the layers 16 and 17 on the plurality of cores 13.

The two portions forming the primary and secondary molding devices are used simultaneously.

The advantage of this is that the cores 13 can be removed from the first mold portion 22a and inserted in the second mold portion 22b using plastic residue or "feedheads" 19a that are formed by solidification of the plastic material that forms the cores 13 in first feed channels 19.

The first feedheads 19a use the end-pieces 3a and temporarily hold together all the cores 13 produced in every molding operation of the first mold portion 22a.

After each molding operation, it is possible to extract the cores 13 getting the first feedheads 19a, and then carrying everything together to the cores in the second mold portion 22b, where layers 16 and 17 are formed.

Here, the gang half-die 22 is structured—by means of appropriate notches—so as to operate even in the presence of the first feedheads 19a which have not yet been removed. There are also secondary feed channels 20 and 21 which do not interfere with the first feedheads 19a, because they are buried within the gang half-die 22.

As shown in FIG. 4, the first feedheads 19a are developed length-wise within the first mold portion 22a so that, when they are placed in the second mold portion 22b of the gang half-die 22, they jut from the gang die, in order to make it easier to move first the cores and then the completed handles.

The invention provides a number of important advantages.

All painting operations are eliminated, thereby avoiding all the painting-associated drawbacks described in the introduction; and the handle 1, though it is still produced from multiple colored plastic material parts, requires no assembly operations.

All parts can be easily molded, owing to the aforementioned raised parts on the core.

These raised parts, as they bring a part of said core to the surface, allow to easily produce the handle's three colors and to put stable, extremely varied types of writings or symbols on the handle.

Furthermore, said layers can be made of higher quality material without substantially increasing costs, given that these layers can be made thin.

The use of thermoplastic rubber, the preferred case, enables achievement of high levels of ergonomics, given the attractive feel of the grip, the reduced risk of accidental slippage, and the reduced fatigue involved in holding the brushes.

The colored plastic material ensure bright, long-lasting colors that optimize the overall look and styling of the brush.

What is claimed is:

1. A multi-colored paintbrush handle, comprising:
    an elongated core of colored plastic material extending along and across an axis and having a first and a second extremity crossed by said axis, said core defining a tip portion at said first extremity and a brush supporting structure at said second extremity;
    an annular protrusion emerging from said core at an intermediate portion thereof and integral therewith, said annular protrusion having a radial height and extending all around said core about said axis;
    a first layer and a second layer of colored plastic material molded onto said core respectively at opposite sides of said annular protrusion, said first layer and second layer each having a thickness substantially corresponding to said radial height of said annular protrusion and defining respectively a main section and a tip section of a grip surface of the handle separated by said annular protrusion, said first and second layer further having a color different from the color of said annular protrusion.

2. A handle as claimed in claim 1, wherein said core further comprises at least one raised portion emerging from said core integrally therewith and spaced from said annular protrusion, said at least one raised portion having a thickness substantially corresponding to said radial height of said annular protrusion and being laterally surrounded by either one of said first layer and second layer to define a distinctive element of the handle.

3. A handle as claimed in claim 1, wherein said first layer is made of a thermoplastic rubber consisting of a mixture of polypropylene and vulcanized rubber.

4. A handle as claimed in claim 3, wherein said first layer contains between 15% and 25% polypropylene by weight, and between 75% and 85% vulcanized rubber by weight.

5. A handle as claimed in claim 1, wherein said first layer and said second layer have colors different from one another.

6. A process for manufacturing a multi-colored paintbrush handle, comprising the steps of:
    injection molding in a first mold an elongated core of colored plastic material extending along and across an axis and having an annular protrusion emerging from said core and integral therewith, said annular protrusion having a radial height and extending all around said core about said axis;
    inserting said elongated core in a second mold and holding said core in position in said second mold by said annular protrusion and by an extremity of said core;
    injection molding first and second layers of colored plastic material onto said core in said second mold at opposite sides of said annular protrusion, wherein said first and second layers have each a thickness substantially corresponding to said radial height of said annular protrusion, and said plastic material of said first and second layers having a color different from the color of the plastic material of said annular protrusion.

7. A process as claimed in claim 6, wherein said first and second layers are injected simultaneously.

8. A process for manufacturing handles of multicolored paintbrushes, comprising the steps of:
    injection molding in a first mold a plurality of elongated cores of colored plastic material spaced from each other in side-by-side relationship and each having an annular protrusion emerging from a respective one of said cores integrally therewith,
    said annular protrusion having a radial height and extending all around the respective one of said cores and said cores being mutually connected by plastic material feedheads;
    removing from said first mold said plurality of cores held together by said feedheads and inserting said plurality of cores connected by said feedheads in a second mold;
    injection molding respective first and second layers of colored plastic material onto each of said cores at opposite sides of said annular protrusion of said cores, said first and second layers having each a thickness substantially corresponding to said radial height of said annular protrusion, and the plastic material of said first and second layers having a color different from the color of the plastic material of said annular protrusion.

9. A process as claimed in claim 8, wherein said first and second layers are injected simultaneously.

* * * * *